United States Patent [19]

Bentley

[11] 3,998,427
[45] Dec. 21, 1976

[54] SELF-CLEANING DRIP IRRIGATION VALVE

[76] Inventor: Clarence Bentley, 9256 Stamps Ave., Downey, Calif. 90240

[22] Filed: Dec. 11, 1975

[21] Appl. No.: 639,647

[52] U.S. Cl. .................... 251/208; 138/46; 239/542
[51] Int. Cl.² .......................................... F16K 5/10
[58] Field of Search ......... 239/568, 533, 535, 101, 239/86, 542, 205, 538, 540, 534; 137/414, 517, 504, 556.6; 251/208; 138/46, 37, 41–43

[56] References Cited
UNITED STATES PATENTS

| | | | |
|---|---|---|---|
| 3,430,867 | 3/1969 | Rodgers et al. | 239/242 |
| 3,437,270 | 4/1969 | Venus, Jr. | 239/534 |
| 3,697,002 | 10/1972 | Parkinson | 239/535 |
| 3,780,946 | 12/1973 | Smith et al. | 239/542 X |
| 3,791,587 | 2/1974 | Drori | 239/542 X |

*Primary Examiner*—Houston S. Bell, Jr.
*Attorney, Agent, or Firm*—Gordon L. Peterson

[57] ABSTRACT

A flow control valve for use with fluid under pressure comprising a valve body having a valve chamber and a resilient grid in the valve chamber. The valve body includes a control member mounted for rotation and having an interior surface partially defining the valve chamber. The resilient grid includes a transverse wall and a plurality of grid walls extending generally transverse to the transverse wall. The grid defines a plurality of open-ended pockets opening toward, and being closed by, the interior surface. The resilient grid and the interior surface cooperate to define a restricted fluid passage with the grid walls and the interior surface cooperating to define a series of restrictions in the fluid passage. The grid walls are resiliently flexible so that they deflect in response to upstream fluid pressure increases resulting from clogging of one of the restrictions. This makes the valve self-cleaning.

22 Claims, 10 Drawing Figures

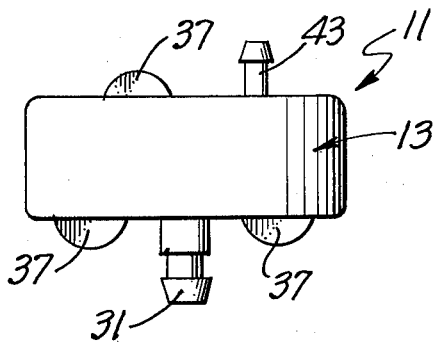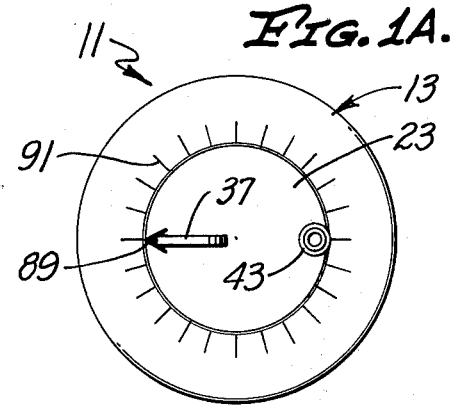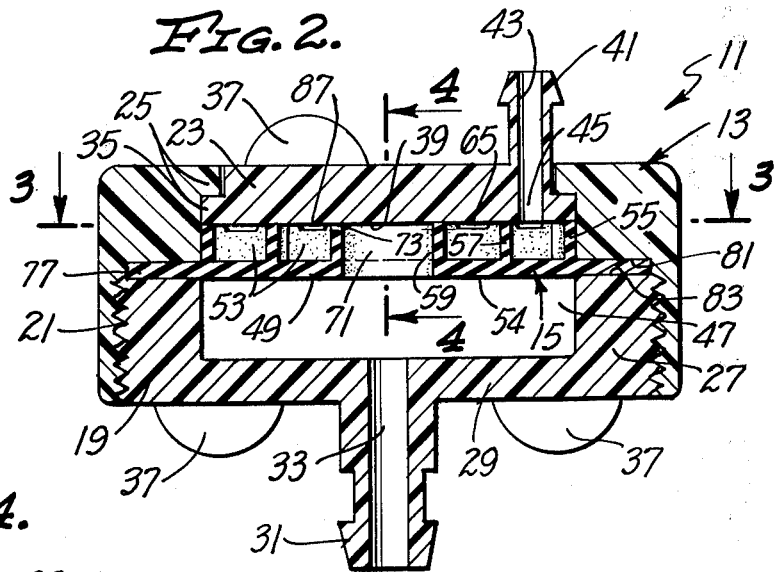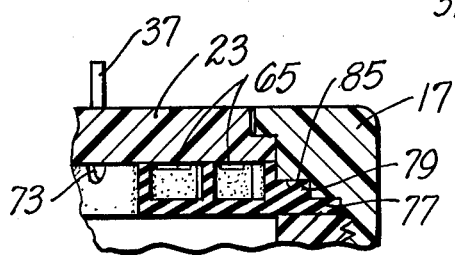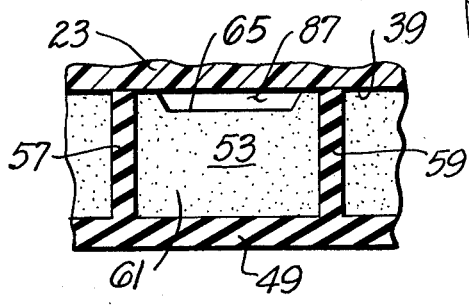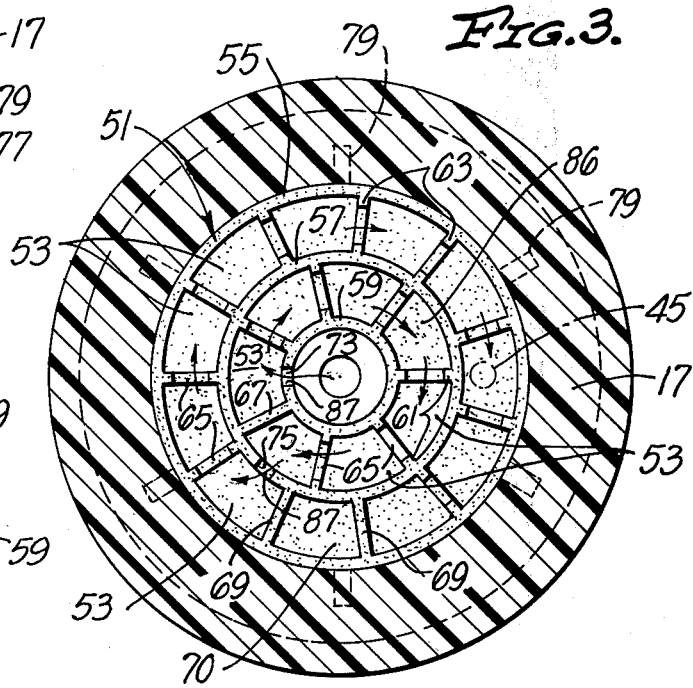

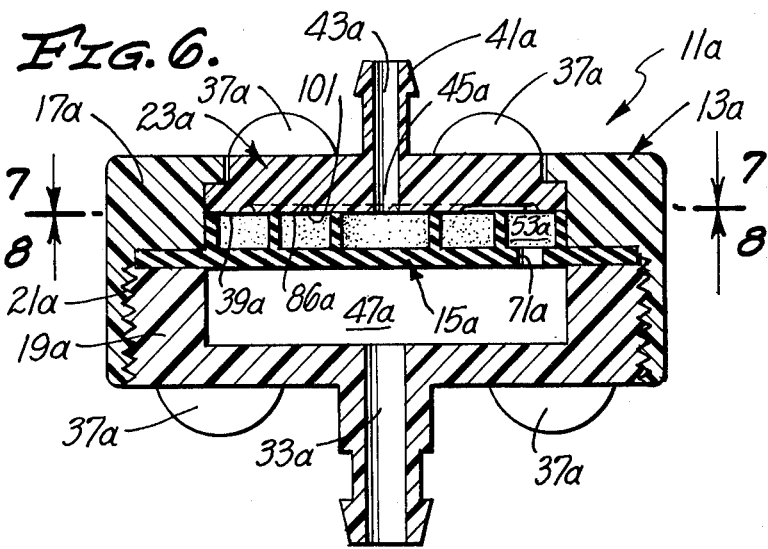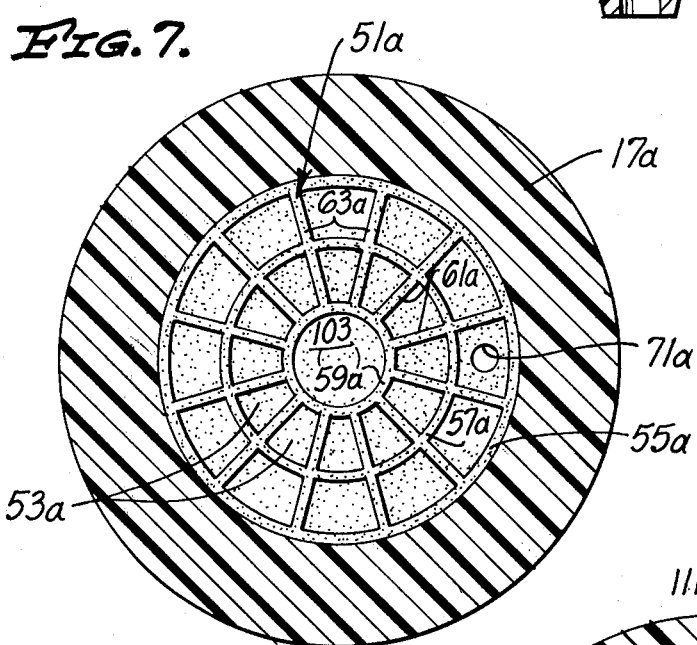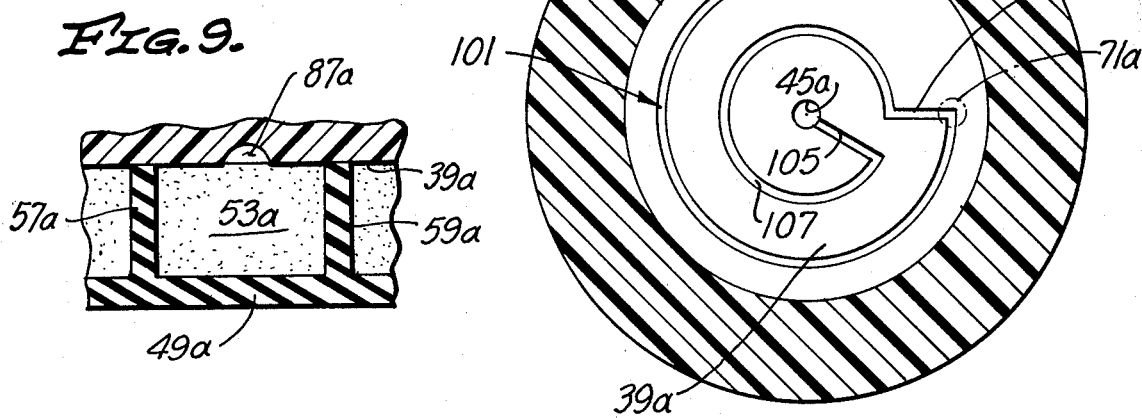

SELF-CLEANING DRIP IRRIGATION VALVE

BACKGROUND OF THE INVENTION

My copending application Ser. No. 546,548 filed on FEB. 3, 1975 and entitled "Flow Control Valve" discloses a drip irrigation valve which allows the flow rate through the valve to be manually selected and which has pressure compensating features. As used herein, pressure compensating means an ability to increase the restriction to flow in response to inlet pressure increases. The expression "pressure compensating" as used herein does not necessarily mean that the flow rate through the valve will be totally immune to inlet pressure fluctuations.

My copending application Ser. No. 603,142 filed on Aug. 8, 1975 and entitled "Drip Irrigation Valve With Helical Flow Path" discloses a drip irrigation valve which, in addition to providing flow rate adjustability and pressure compensation, has an advantageous self-cleaning feature. This latter valve utilizes axially movable components at least one of which is relatively difficult to mold.

SUMMARY OF THE INVENTION

The present invention provides a novel drip irrigation valve which is easy to make and which has a self-cleaning feature of the type shown in my last mentioned copending application. The drip irrigation valve of this invention may also have pressure compensating and flow rate selection features.

One feature of this invention is the provision of an internal member in the form of a resilient grid. The resilient grid can be simply and inexpensively molded from a suitable flexible, resilient material, and it is instrumental in obtaining self-cleaning, pressure compensation, and flow rate adjustment.

More specifically, the flow control valve of this invention may include a valve body defining a valve chamber. The resilient grid includes a transverse wall extending transversely across the valve chamber and a plurality of grid walls extending generally transverse to the transverse wall. The grid walls and the transverse walls define a plurality of open-ended pockets.

Means are provided for defining an interior surface within the valve chamber for closing the open ends of the pockets. This surface may be defined, for example, by the valve body.

The interior surface and the resilient grid cooperate to define a restricted fluid passage. This restricted fluid passage may be provided in various different ways such as by a groove in the interior surface and/or a groove or notches in the grid walls. At least some of the grid walls cooperate with the interior surface to define a series of orifices or restrictions in the fluid passage. The orifices provide the necessary pressure drop to assure that the valve will be capable of serving as a drip irrigation valve.

Each of the grid walls across which fluid flows is preferably resiliently flexible. This enables the valve to be self-cleaning. Specifically, if one of the orifices becomes clogged with particulate matter, the pressure drop across the orifice increases until it is sufficient to deflect the associated grid wall sufficiently to free the particle. The particle then proceeds to pass through each of the orifices of the restricted fluid passage much in the same way to the valve outlet.

Because the transverse wall of the grid is resilient, the flow control valve can be made pressure compensating by exposing the side of the transverse wall outside of the pockets to fluid at inlet pressure. As inlet pressure increases, it forces the grid walls toward the interior surface to tend to reduce the cross sectional areas of the restricted orifices. By appropriately selecting the degree of resilience of the grid, the degree of pressure compensation can be adjusted. For example, it may be desirable to maintain flow rate through the valve substantially independent of inlet pressure variations in which event the reduction in orifice size should substantially completely compensate for the increase in inlet fluid pressure.

If, as indicated hereinabove, the transverse wall divides the valve chamber into first and second chambers, then the passage means are necessary to provide communication between the restricted fluid passage and the portion of the valve chamber outside of the grid. This can advantageously be accomplished by providing an appropriate passage through the resilient grid. For example, the passage may be an aperture in the transverse wall.

Similarly, it is necessary to provide communication between the restricted fluid passage and the exterior of the valve. This can be accomplished by providing a suitable passage in the valve body which communicates with the restricted fluid passage.

The flow rate through the flow control valve can be manually adjusted without changing of any parts if the valve body includes an angularly positionable control member which may be mounted for rotation on other portions of the valve body. By angularly positioning the control member, the length of the restricted fluid passage through which fluid must flow in passing through the restricted fluid passage can be varied. In this manner, the flow rate through the valve can be adjusted.

The control member may have an outlet passage which terminates in a port adapted to communicate with various ones of the pockets depending upon the angular position of the control member. Alternatively, the interior passage referred to above may be formed at least in part on the control member and the interior surface may include a groove which cooperates with the grid to define the restricted fluid passage. In this latter instance, the outlet passage terminates in a port at one end of the groove and the groove is adapted to pass through a large number of the compartments. By angularly positioning the flow control member, the length of the groove between the aperture in the grid, i.e. the inlet to the restricted fluid passage and the outlet can be varied to vary the flow rate through the valve.

The grid can also be used to provide a shut off position in which no fluid flows through the valve. Locator means can be used to angularly orient the resilient grid relative to the valve body so that meaningful flow rate indicia can be provided on the valve body.

The invention, together with further features and advantages thereof, can best be understood by reference to the following description taken in connection with the accompanying illustrative drawing.

BRIEF DESCRIPTION OF THE DRAWINGS

FIG. 1 is a side elevational view of a drip irrigation valve constructed in accordance with the teachings of this invention.

FIG. 1A is a top plan view of the valve.

FIG. 2 is a sectional view through the valve of FIG. 1.

FIG. 3 is a sectional view taken generally along line 3—3 of FIG. 2.

FIG. 4 is a fragmentary sectional view taken generally along line 4—4 of FIG. 2.

FIG. 5 is an enlarged fragmentary sectional view of a portion of the grid and control member.

FIG. 6 is a sectional view similar to FIG. 2 showing another form of drip irrigation valve constructed in accordance with the teachings of this invention.

FIGS. 7 and 8 are sectional views taken along lines 7—7 and 8—8, respectively, of FIG. 6.

FIG. 9 is an enlarged, fragmentary sectional view of a portion of the grid and control member.

DESCRIPTION OF THE PREFERRED EMBODIMENTS

FIGS. 1–5 show a drip irrigation valve 11 which generally includes a valve body 13 and an internal member or grid 15. Although the valve 11 is described herein as a drip irrigation valve, it should be understood that its usage is not necessarily limited to drip irrigation.

The valve body 13 includes body sections 17 and 19 suitably releasably interconnected as by screw threads 21 and a control member 23 mounted for rotation relative to the body section 17. The body section 17 is of tubular construction and includes a radially inwardly extending peripheral flange 25. The body section 19 has a tubular portion 27 received within the body section 17 and an end wall 29. An inlet fitting 31 is formed integrally with the end wall 29 and provides an inlet 33 for the valve 11.

The control member 23, in the embodiment illustrated, is generally in the form of a flat disc having a peripheral flange 35 which cooperates with the flange 25 to prevent removal of the control member out through the top of the body section 17. The control member 23 is angularly positionable relative to the body sections 17 and 19, and this is preferably accomplished by mounting the control member for rotation with such rotation being possible without unscrewing the body sections 17 and 19. The control member 23 is mounted for rotation by the flanges 23 and 35 and the grid 15. Specifically, the grid 15 holds the flange 35 against the flange 25. To facilitate rotation of the control member 23 relative to the body sections 17 and 19, protrusions 37 are formed on the control member and on the end wall 29.

The control member 23 has a flat planar interior surface 39 and an outlet fitting 41 is formed integrally with the control member and defines an outlet passage 43 for the valve 11. The outlet passage 43 terminates in a port 45 at the interior surface 39.

Each of the body sections 17 and 19 and the control member 23 may be integrally molded from a suitable rigid plastic material. The body sections 17 and 19 and the control member 23 cooperate to define a valve chamber 47.

The grid 15 includes an end wall or transverse wall 49 and a plurality of grid walls 51 which extend generally perpendicular from the transverse wall 49 toward the interior surface 39. The transverse wall 49 cooperates with the grid walls 51 to define a plurality of open-ended pockets 53. The transverse wall has an outer face 54 exposed to fluid at inlet pressure.

The grid walls 51 may be provided in various different configurations, and the configuration illustrated in the embodiment of FIGS. 1–5 is purely illustrative. In the embodiment of FIGS. 1–5, the grid walls 51 includes an outer cylindrical grid wall 55, an intermediate cylindrical grid wall 57, and an inner cylindrical grid wall 59, all of which are concentrically arranged and radially spaced. The grid walls 51 also include circumferentially spaced, radial grid walls 61 extending radially between the inner cylindrical grid wall 59 and the intermediate grid wall 57, and circumferentially spaced radial grid walls 63 extending radially between the intermediate grid wall 59 and the outer grid wall 55. With this construction, the pockets 53 are arranged in outer and inner concentric circular patterns or rows as shown in FIG. 3 with the two rows of pockets forming radially spaced groups of pockets.

Each of the radial grid walls 61 and 63 has a groove or notch 65 in the upper edge thereof. An unnotched radial grid wall 67 extends between the inner grid wall 59 and the intermediate grid wall 57. Two adjacent unnotched radial grid walls 69 extend between the intermediate grid wall 57 and the outer grid wall 55 and partially define a closed pocket 70 (FIG. 3). The inner grid wall 59 defines an aperture 71 and an opening or passage means 73 in the inner grid wall 59 provides communication between the aperture 71 and one of the pockets 53 which is partially defined by the unnotched grid wall 67. An opening 75 provides communication between the inner row of pockets 53 and the outer row of pockets 53. The opening 75 is arranged to provide direct communication between the pockets 53 which are partly defined by the unnotched radial wall 67 and one of the unnotched radial walls 69.

The transverse wall 49, in the embodiment illustrated, is generally planar and extends radially beyond the outer grid wall 55 to define a peripheral flange 77. A plurality of radially spaced axially extending webs 79 project axially from the flange 77 as shown in FIGS. 3 and 4. The grid 15 may be considered to divide the valve chamber into two separate chambers.

Although the grid 15 can be constructed of various different materials, it is preferred to integrally mold the grid 15 from a flexible resilient material such as rubber. This facilitates manufacture of the grid 15 and the resilience of the grid contributes to the pressure compensating and selfcleaning features of this invention.

Although the grid 15 can be installed in the valve chamber 47 in various different ways, in the embodiment illustrated, this is accomplished by clamping the peripheral flange 77 between clamping faces 81 and 83 of the body sections 17 and 19, respectively. The body section 17 has a plurality of recesses 85 which correspond in number and spacing to the web 79. During assembly, the grid 15 is angularly oriented relative to the body section 17 so as to position the webs 79 in the recesses 85, respectively, thereby angularly orienting the grid relative to the body section 17. Thus, the webs 79 and the recesses 85 constitute locator means for orienting the grid 15.

With the grid 15 installed in the valve chamber 47, the interior surface 39 engages the upper ends of the grid walls 51 to close the open upper ends of the pockets 53. Accordingly, the only communication between the pockets 53 in each of the circular rows of pockets is provided by the notches 65, and the only communication between the rows of pockets is provided by the opening 75. Thus, the grid 15 and the interior surface 39 cooperate to define a restricted fluid passage 86 (FIG. 3) with the transverse wall 49 and the interior surface 39 forming opposite sides of the restricted fluid passage. Each of the radial grid walls 61 and 63 cooperates with the interior surface 39 to define a restriction or orifice 87. The orifices 87, which may be of the same or different cross sectional area, are arranged in series so that fluid passing through the restricted flow passage 86 must flow through a plurality of the orifices. The openings 73 and 75 similarly cooperate with the interior surface 39 to define additional restricted orifices 87 in the fluid passage and the cross sectional area of such orifices may be of the same as, or different from, the cross sectional area of the orifices 87 defined by the grid walls 61 and 63 and the interior surface 39.

The inlet to the restricted fluid passage 86 is provided by the aperture 71 and the opening 73. The outlet for the restricted flow passage 86 is the port 45. In the embodiment of FIGS. 1–5, the port 45 is movable with the control member 23 so that the port 45 can be selectively placed in any one of the pockets 53 of the outer row of pockets. As the location of the port 45 can vary, the length of the fluid passage 86 and the number of restrictions in the fluid passage are corespondingly variable to vary the flow rate through the fluid passage. By placing the port 45 in the closed pocket 70, a shut-off position is provided because the closed pocket 70 does not communicate with any of the pockets 53.

In use of the valve 11, the inlet fitting 31 is connected to a source of fluid such as water and the outlet fitting 41 may be connected to an outlet tube (not shown) or be allowed to drip directly onto the ground. Fluid enters the valve chamber 47 and passes through the aperture 71, the opening 73, all of the pockets 53 of the inner row of pockets, the opening 75, and all of the pockets 53 of the outer row of pockets between the opening 75 and the pocket in which the port 45 is positioned. The pressure drops across the orifices 87 provide a substantial pressure reduction so that the fluid flow rate through the valve 11 is suitable for drip irrigation purposes. Although the flow rate through the valve 11 can be varied by turning the control member 23 to position the port 45 in another of the pockets 53 of the outer row of pockets, it should be understood that the flow control feature of this invention could be eliminated, if desired.

As shown in FIG. 1A, the flow control member 23 has a pointer 89 and the body section 17 has flow rate indicia 91. Accordingly, the operator can set the valve 11 to discharge known amounts of fluid.

A primary feature of this invention is the ability of the valve 11 to self clean. If a particle should become lodged in one of the orifices 87, the fluid pressure upstream of the clogged orifice will increase thereby increasing the pressure drop across the clogged orifice. With the present invention, however, each of the grid walls 51 which assists to define one of the orifices 87 is resiliently flexible. Accordingly, as the pressure drop across the clogged orifice increases, the resilient flexible grid wall 51 which partially defines the clogged orifice deflects to allow passage of the particle into the next pocket 53. If this particle should become lodged in another of the orifices 87, the action described above is repeated until the particle has traveled completely through the valve 11. In this manner, the valve 11 is automatically self cleaning. Of course, the body sections 17 and 19 can be unscrewed to provide for manual cleaning.

If it is desired to make the valve 11 pressure compensating, then the transverse wall 49 should be resiliently flexible. In response to a pressure increase at the inlet 33, the pressure on the outer face 54 of the transverse wall increases relative to the pressure in the restricted fluid passage 86. This increased pressure differential urges the grid walls 51 more tightly against the interior surface 39. This in turn causes the grid walls 51 to deform to reduce the cross sectional area of each of the orifices 87. Accordingly, as the restriction to fluid flow increases with an increase in inlet pressure, the valve 11 is pressure compensating. The pressure compensating feature can be eliminated if desired.

FIGS. 6–8 show a valve 11a which is substantially identical to the valve 11 in all respects not specifically shown or described herein. Portions of the valve 11a corresponding to portions of the valve 11 are designated by corresponding reference numerals followed by the letter a.

Except for the construction of the control member 23a, the valve body 13a is identical to the valve body 13. The control member 23a differs from the control member 23 in that a groove 101 (FIGS. 6 and 8) is provided on the interior surface 39a and the outlet fitting 41a, the outlet 43a, and the port 45a are centrally located on the axis of rotation of the control member 23a.

The grid 15a differs from the grid 15 in that the aperture 71a is displaced radially from the center of the grid to provide communication between the valve chamber 47a and one of the pockets 53a of the outer row of pockets. The grid walls 51a are devoid of notches and the pockets 53a of the inner and outer rows of pockets are in radial alignment. The grid 15a cooperates with the interior surface 39a to define a central outlet pocket 103.

The groove 101 may be of the same depth throughout or of varying depth. A preferred configuration for the groove 101 is shown in FIG. 8. The groove 101 includes an inner radial leg 105 of sufficient length to extend radially outwardly from the port 45a to the inner row of pockets 53a. The groove 101 also includes an inner circular section 107, an outer radial leg 109, and an outer circular section 111. The inner circular section 107 extends from the outer end of the inner radial leg 105 circumferentially a sufficient length to provide communication between all of the pockets 53a of the inner row of pockets. However, the inner circular section 107 is short enough so that it does not terminate in the same pocket 53a in which it begins.

The outer radial leg 109 extends radially outwardly to join the ends of the circular sections 107 and 111. The outer radial leg is of sufficient length to provide communication between the inner and outer circular rows of the pockets 53a. The outer circular section 111 is of sufficient length to provide communication between all of the pockets 53a of the outer circular row of pockets except one. In other words, there is always one pocket 53a of the outer row intermediate the starting and ending locations of the outer circular section 111. Although this is not essential, it is desirable so that a shut-off position can be provided.

With the construction of FIGS. 6–8, the interior surface 39a and the grid 15a cooperate to define a restricted fluid passage 86a (FIG. 6). However, restrictions or orifices 87a (FIG. 9) are defined by the grid walls 51a and the groove 101.

The flow path through the valve 11a is from the inlet 33a through the aperture 71a, the restricted fluid passage 86a and the port 45a to the outlet 43a. Flow rate control is obtained by turning the control member 23a to vary the length of the restricted fluid passage 86a.

With the valve 11a, the port 45a and the aperture 71a remain stationary; however, the groove 101 moves with the control member 23a to increase or decrease the length of the restricted fluid passage 86a. As shown in FIG. 8, fluid entering the aperture 71a passes through the radial leg 109, the inner circular section 107, and the inner radial leg 105 to the port 45. By rotating the control member 23a counterclockwise as viewed in FIG. 8, the restricted fluid passage 86a is lengthened in that the fluid must flow through at least a portion of the outer circular section 111 and this decreases the flow rate through the valve. By rotating the control member 23a clockwise from the position shown in FIG. 8 so that the pocket 53a containing the aperture 71a communicates only with the space between the ends of the outer circular section 111, a shut-off position is obtained.

The valve 11a is also self cleaning and pressure compensating. These features are obtained in substantially the same manner as described above in connection with FIGS. 1–5.

Although exemplary embodiments of the invention have been shown and described, many changes, modifications and substitutions may be made by those having ordinary skill in the art without necessarily departing from the spirit and scope of this invention.

I claim:

1. A drip irrigation valve for fluid under pressure comprising:
    means defining a fluid passage having a fluid passage inlet for receiving fluid under pressure and a fluid passage outlet;
    said fluid passage having opposed surface regions on opposite sides of the fluid passage;
    said means including a plurality of resilient walls in said fluid passage, each of said walls extending from one of said surface regions toward the other of said surface regions to define therewith a restricted orifice;
    a first group of said orifices being located generally radially outwardly of a second group of said orifices;
    at least some of said orifices in both of said groups being arranged in series whereby fluid flowing through the fluid passage can pass through a plurality of said orifices and be subjected to pressure drops; and
    each of said walls being of sufficient resilience to flex in response to an upstream pressure increase resulting from clogging of the associated orifice whereby the fluid passage is self cleaning.

2. A drip irrigation valve as defined in claim 1 including means for varying the length of the fluid passage between the fluid passage inlet and the fluid passage outlet to thereby vary the number of said orifices in the fluid passage and the flow rate through the fluid passage.

3. A drip irrigation valve as defined in claim 1 wherein said means includes a resilient wall defining at least a portion of said fluid passage, said resilient wall having a surface outside of said fluid passage, means for exposing said surface of said resilient wall to substantially the pressure of the fluid which exists at said fluid passage inlet whereby any increase in the pressure of the fluid at the fluid passage inlet resiliently moves said wall inwardly to increase the restriction to flow through the fluid passage.

4. A drip irrigation valve as defined in claim 3 including means for varying the length of the fluid passage between the fluid passage inlet and the fluid passage outlet to thereby vary the number of said orifices in the fluid passage and the flow rate through the fluid passage.

5. A drip irrigation valve as defined in claim 1 wherein said means includes first and second relatively movable members, one of said members being resilient and having said resilient walls thereon.

6. A drip irrigation valve as defined in claim 1 wherein at least one of said walls engages said other side of the fluid passage, at least one of said one wall and said other side having a groove therein to provide for fluid flow across said one wall.

7. A valve for use with fluid under pressure comprising:
    a valve body having a valve chamber and means for providing communication between the valve chamber and the exterior of the valve body;
    an internal member within the valve chamber, said internal member including a transverse wall extending across the valve chamber and a plurality of grid walls extending generally transverse to the transverse wall, said grid walls and said transverse wall defining a plurality of open-ended pockets;
    means for providing an interior surface within said valve chamber for closing the open ends of said pockets;
    means on the internal member and said interior surface for defining a restricted fluid passage between said interior surface and said internal member with at least some of the grid walls and the interior surface cooperating to define a series of orifices in the fluid passage;
    at least a portion of at least one of the grid walls being sufficiently flexible so that it deflects in response to an upstream pressure increase resulting from clogging of the associated orifice with particulate matter whereby the deflection of said one grid wall tends to free the particulate matter to thereby make the restricted fluid passage self cleaning;
    first passage means for providing communication between the fluid passage and the valve chamber; and
    second passage means for providing communication between the fluid passage and the exterior of the valve body.

8. A valve as defined in claim 7 wherein at least a portion of the transverse wall is resilient and exposed to the pressure of the fluid at the inlet to the fluid passage, said transverse wall being resiliently movable in response to a change in fluid pressure at the inlet to change the restriction to fluid flow through the fluid passage whereby the valve is made pressure compensating.

9. A valve as defined in claim 7 including means for relatively moving said interior surface and said internal member in a way to vary the length of the fluid passage through which fluid flows in moving through the fluid passage whereby the flow rate through the valve can be varied.

10. A valve as defined in claim 7 including means for relatively moving said interior surface and said internal member in a way to vary the length of the fluid passage through which fluid flows in moving through the fluid passage whereby the flow rate through the valve can be varied.

11. A valve as defined in claim 7 wherein said internal member is constructed of flexible resilient material.

12. A valve as defined in claim 7 wherein said means defining the restricted fluid passage includes a groove on said interior surface.

13. A valve as defined in claim 7 wherein said means defining said restricted fluid passage includes at least one notch in an edge of at least one of said grid walls, said edge confronting said interior surface.

14. A valve as defined in claim 7 wherein at least some of said grid walls extend circumferentially and other of said grid walls extend generally radially, and said pockets are arranged in at least two concentric circles.

15. A valve as defined in claim 7 wherein said valve body includes at least one body member and a control member which is positionable at a plurality of different angular positions relative to said body members, at least a portion of said interior surface being on said control member, at least a portion of said second passage means being in said control member, said second passage means terminating in a port, said port being movable with said control member to place the port in any one of a plurality of said pockets to thereby vary the number of said restrictions through which fluid must flow in passing through said restricted fluid passage whereby the flow rate through the valve can be varied.

16. A valve as defined in claim 15 wherein said valve body includes at least one body member and a control member which is positionable at a plurality of different angular positions relative to said body member, at least a portion of said interior surface being on said control member, at least a portion of said second passage means being in said control member, said second passage means terminating in a port, said means defining the restricted fluid passage including a groove in the interior surface, said groove being movable with said control member to vary the length of the restricted fluid passage through which fluid must flow in passing through said restricted fluid passage.

17. A flow control valve for use with fluid under pressure comprising:
a valve body having a valve chamber and including first and second body members;
a resilient grid in the valve chamber, said resilient grid having a peripheral flange;
means for connecting said first and second body member with the peripheral flange being clamped between portions of said body members to divide the valve chamber into first and second chambers;
said valve body including a control member, said control member being positionable at a plurality of different angular positions relative to said first and second body members, said control member having an interior surface partially defining the valve chamber;
said resilient grid including a transverse wall and a plurality of grid walls extending generally transverse to the transverse wall, said grid walls and said transverse wall defining a plurality of pockets opening toward and being closed by said interior surface;
means defining an inlet to the first chamber;
means on said resilient grid and said interior surface for defining a restricted fluid passage in said second chamber with the grid walls and the interior surface cooperating to define a series of restrictions in said fluid passage;
opening means in said grid for providing communication between the first chamber and the restricted passage; and
an outlet passage terminating in a port in said interior surface of said control member, said control member being positionable to vary the number of said restrictions through which fluid must flow in passing through the restricted fluid passage whereby the flow rate through the valve can be varied.

18. A flow control valve as defined in claim 17 including locator means for accurately angularly locating the resilient grid relative to the valve body and indicia on the control member and the valve body providing an indication of the flow through the flow control valve.

19. A flow control valve as defined in claim 17 including means responsive to the control member being in a first position for blocking flow through the restricted fluid passage.

20. A valve for use with fluid under pressure comprising:
a member including a transverse wall and a plurality of grid walls extending generally transverse to the transverse wall, said grid walls and said transverse wall defining a plurality of open-ended pockets, said pockets opening axially of the valve;
means for providing a surface for closing the open ends of said pockets;
first means on the member and said surface for defining a restricted fluid passage between said surface and said member with at least some of the grid walls and the interior surface cooperating to define a plurality of orifices in the fluid passage;
at least a portion of at least one of the grid walls being sufficiently flexible so that it deflects in response to an upstream pressure increase resulting from clogging of the associated orifice with particulate matter whereby the deflection of said one grid wall tends to free the particulate matter to thereby make the restricted fluid passage self-cleaning;
means for providing an inlet of the fluid passage; and
means for providing an outlet to the fluid passage.

21. A valve as defined in claim 20 wherein said member is integrally molded from a flexible resilient material.

22. A valve as defined in claim 20 wherein said first means includes a groove in said surface.

* * * * *